United States Patent [19]

Pagliaro

[11] Patent Number: 4,702,376

[45] Date of Patent: Oct. 27, 1987

[54] COMPOSITE VACUUM BAG MATERIAL HAVING BREATHER SURFACE

[75] Inventor: Ernest H. Pagliaro, Orange, Conn.

[73] Assignee: Fairprene Industrial Products Company, Inc., Fairfield, Conn.

[21] Appl. No.: 915,043

[22] Filed: Oct. 3, 1986

[51] Int. Cl.$^4$ .............................................. B65D 81/20
[52] U.S. Cl. .................................... 206/524.8; 383/113
[58] Field of Search ................... 55/364, 382, DIG. 6; 383/113, 116, 86; 206/524.8

[56] References Cited

U.S. PATENT DOCUMENTS

| | | | |
|---|---|---|---|
| 1,704,284 | 3/1929 | Crawford | 383/113 |
| 2,243,353 | 5/1941 | Martinet et al. | 55/382 |
| 2,488,922 | 11/1949 | Mead | 206/524.8 X |
| 2,674,340 | 4/1954 | Vance | 55/382 X |
| 2,784,757 | 3/1957 | Bosca et al. | 383/86 X |
| 2,959,832 | 11/1960 | Baermann | 55/DIG 6 X |
| 3,289,722 | 12/1966 | Hardenbrook | 383/116 |
| 3,358,415 | 12/1967 | Kurfirst | 206/524.8 X |
| 3,705,645 | 12/1972 | Konen | 383/116 X |
| 4,136,205 | 1/1979 | Quattlebaum | 206/524.8 X |
| 4,488,647 | 12/1984 | Davis | 206/524.8 X |

Primary Examiner—Kathleen J. Prunner
Attorney, Agent, or Firm—Gary, Juettner & Pyle

[57] ABSTRACT

A composite vacuum bag material includes a flexible fabric of polymeric material having a void free layer of elastomer bonded to one side. The exposed fabric surface, treated with a release agent provide air passageways when applied against the surface of an article during vacuum bagging.

8 Claims, 4 Drawing Figures

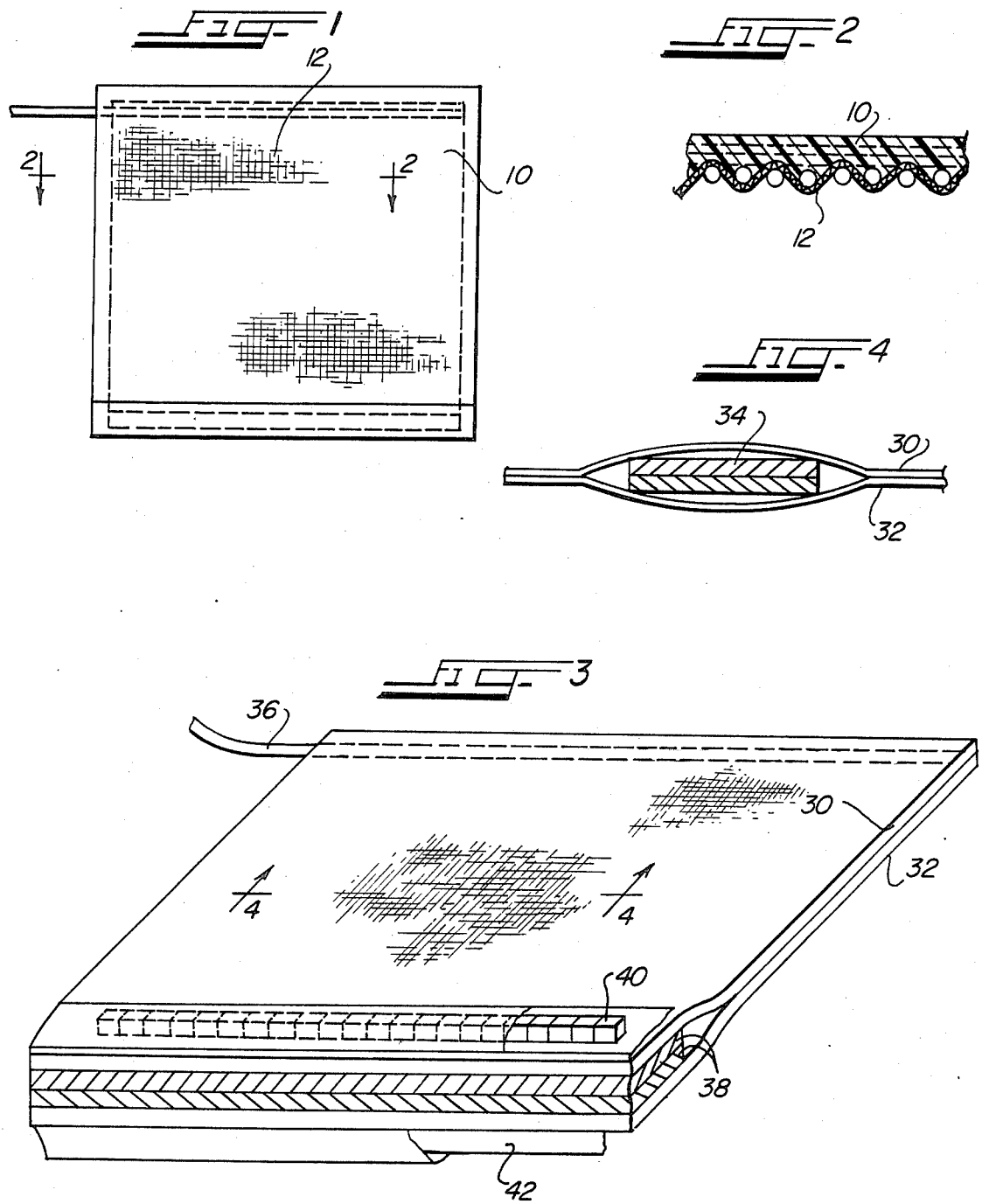

COMPOSITE VACUUM BAG MATERIAL HAVING BREATHER SURFACE

BACKGROUND OF THE INVENTION

This invention relates to materials used to surround composites, laminates and the like during a vacuum bagging operation in which a negative pressure is applied within the bag to compress the composite or laminate during a cure cycle.

The production of various types of laminates or composites requires the application of external pressure. For example, in the manufacture of safety windows for vehicles, a plastic film is sandwiched between a pair of glass sheets, and the assembly is compressed and heated to complete the laminate. If the surfaces of the laminate are flat, then flat platens may be employed. If the surfaces are curved or irregular, resort is often made to a vacuum bagging technique.

In conventional vacuum bagging, an impervious or non-porous envelope or bag of flexible material is disposed around the assembly to be laminated. The envelope or bag is connected to a vacuum pump, and air is evacuated, causing pressure or compressive forces to be applied to the assembly. Often, a separate, porous, breather fabric is inserted between the bag and the article to facilitate withdrawal of residual gas and to provide release properties. Conventionally, the release or breather layer has included, for example, glass fabrics coated with polytetrafluoroethylene and is porous throughout its thickness.

Various types of release or breather sheets are disclosed in the following U.S. Pats. Nos.: 3,666,600; 4,062,917; 4,216,047; 4,353,855; and 4,548,859. In the latter patent, a breather material is disclosed, which includes a ribbed fabric and a silicone rubber coating. Both the fabric and rubber layers are porous, and a separate impervious bag is disposed around the breather material to complete the assembly.

SUMMARY OF THE INVENTION

The present invention provides a composite breather and vacuum bag material in the form of a flexible laminate having an outer non-porous layer and an inner surface breather layer which is impregnated with a release agent. This eliminates the necessity of using a separate breather material.

The vacuum bag preferably comprises an outer, non-porous layer of silicone or similar rubber and an inner layer of heat resistant woven or braided textile of polymeric fibrous material. The textile is impregnated with a particular primer material to improve bonding to the outer elastomer layer and to provide a release coating in the exposed rough surface or interstices of the textile. The rough textile surface provides air passageways along the surface thereof to allow the bag material to be drawn tight against the surface of an object during application of a vacuum. The fabric surface provides sufficient passages to allow removal of air at the interface between the material and the surface of the object.

THE DRAWING

FIG. 1 is a plan view of the fabric or breather side of the composite vacuum bag material of the present invention.

FIG. 2 is a sectional view taken along lines 2—2 of FIG. 1.

FIG. 3 is a perspective view of a vacuum bag made from the material shown in FIGS. 1 and 2.

FIG. 4 is a sectional view taken along lines 4—4 of FIG. 3.

DESCRIPTION OF THE PREFERRED EMBODIMENTS

As shown in the drawing, the composite vacuum bag material comprises a non-porous or void free elastomer layer or sheet 10 bounded to one side of a woven or knitted fabric layer 12. Whereas the prior art has contemplated the use of separate breather and bag materials arranged in layers, the present material is a composite laminated sheet.

The fabric layer is preferably made from synthetic polymer fibers having a high degree of flexibility and good temperature resistance. Suitable materials include, for example, polyester, polyaramid, acrylic or the like, used alone or blended together or with other fibers. The fiber is preferably flexible and is capable of deforming under application of heat and pressure such that the vacuum bag will conform to the surface of the laminate. For this reason, relatively stiff fibers such as glass are not employed.

The elastomer employed may be selected from a variety of rubbers. In the preferred embodiment, a silicone elastomer is employed, but others may be used such as fluorosilicones, fluoroelastomers, ethylenepropylene terpolymers, nitriles, and the like. Criteria for the elastomer include flexibility and heat resistance necessary to withstand repeated molding cycles.

The woven or knitted fabric is first treated with a primer comprising the combination of a bonding and release agent prior to lamination to the elastomer layer. The fabric, for example, may be immersed in a dilute solution of the primer and then dried to release the solvent. Sufficient primer is applied to penetrate the fibers of the fabric, while leaving a rough coated surface of the fabric exposed upon drying.

If a silicone elastomer is used, the fabric may be impregnated with a primer comprising a solution of a silicone rubber and an adhesive or coupling agent, such as a silane. The silicone rubber provides a good release finish to the exposed surface of the fabric. The coupling agent and rubber provide a good bond between the fabric and the impervious elastomer layer.

After application of the primer to the fabric and drying, the elastomer is calendered into a sheet and applied over the surface of one side of the coated fabric. The two layers are then heated under pressure for a sufficient length of time and conditions to cure the elastomer and to bond the elastomer layer to the fabric layer. During this procedure, the elastomer only partially penetrates the thickness of the fabric, leaving an exposed fabric surface on the opposite side, such surface being textured or uneven. This textured surface provides air passageways when the surface is brought against a facing surface of an article during vacuum bagging. That is, even though the treated fabric surface may come into surface contact with the surface of the article, the texture in the surface allows for continued removal of air from the bag.

FIGS. 3 and 4 illustrate a vacuum bag made from the material of the present invention. In the embodiment illustrated, a pair of rectangular sheets 30 and 32 of the material are joined around three edges with the fabric surfaces facing each other. The remaining end has an opening to allow insertion of the article 34, such as an assembly of sheets to be laminated.

The open end may be closed by a suitable clamp after insertion of a tube 36, which is connected to a vacuum pump. In the embodiment shown, the opposed lips of the opening are lined with strips 38 of soft rubber. Clamping forces are provided by the use of a bar magnet 40 disposed along one outer edge of the lip, and a metal bar 42 across the other edge, attracting the magnet and completing the air tight seal.

As shown, as pressure within the bag is decreased by removal of air, the outside air pressure exerts compressive forces on the laminate 34. Also, although not shown, since heat is normally required in the lamination procedure, the bag and contained article would be disposed within an oven and heated to the desired temperature.

In a specific example of the present invention a knitted or woven polyester fabric is employed. Silicone rubber containing 1 to 5 percent silane is dissolved in a solvent system of tolulene and methyl ethyl ketone (5 to 35% solids) together with a benzoyl peroxide catalyst. The fabric is immersed in the solution, removed, and dried for 5 minutes at 180° F. The dry treated fabric contains from about 4 to about 40% of treatment solids.

Silicone rubber compound is calendered on one side of the treated fabric at a thickness ranging from about 0.005 to about 0.1 inches. The typical rubber to fabric ratio is in the order of from about 2 to 1 to about 5 to 1. The composite is than cured under heat and pressure, i.e., from about 230° F. to about 350° F., and from bout 5 to about 150 psi. The cure conditions are such that the rubber film is pressed into the interstices of the fabric on one side but does not penetrate to the other side. The other side of the fabric contains visible interstices of the fabric, with a thin coating of silicone rubber that serves as a release agent. The resulting material can be employed as a vacuum bag operating at temperatures up to 275° F., with excursions up to 350° F. Other fabrics may be employed if higher operating temperatures are required. For example, fabrics composed of polyaramids will permit temperature excursions of up to 450° F., and glass fabrics will permit excursions of up to 500° F.

I claim:

1. A vacuum bag for application to the surface of an article, said vacuum bag comprising a flexible fabric substrate impregnated with an elastomer, said substrate having a void free continuous layer of elastomer on one side, the other side having exposed fabric interstices providing air passageways between said other side and said article surface.

2. The vacuum bag of claim 1 wherein said elastomer impregnating said substrate comprises silicone rubber, said rubber providing release properties to the other side of said substrate.

3. The vacuum bag of claim 1 wherein said void free continuous layer of elastomer comprises silicone rubber.

4. The vacuum bag of claim 1 wherein said fabric substrate is a woven material.

5. The vacuum bag of claim 1 wherein said substrate comprises knitted material.

6. The vacuum bag of claim 1 wherein said fabric comprises polyester.

7. The vacuum bag of claim 1 wherein said substrate is in the form of a pouch having an open end, the other side of said substrate facing inwardly.

8. The vacuum bag of claim 7 additionally comprising clamp means to close the open end of said pouch, said clamp means comprising a magnet on one side of the open end and a metal bar attracted to the magnet on the other side.

* * * * *